United States Patent
Drozd et al.

(10) Patent No.: US 8,713,781 B2
(45) Date of Patent: May 6, 2014

(54) TRIM ATTACHMENT METHOD AND ASSOCIATED PRODUCT

(75) Inventors: Eric Drozd, Farmington Hills, MI (US); Eric Waligora, Fenton, MI (US); Sean Scott, Walled Lake, MI (US)

(73) Assignee: Cooper-Standard Automotive Inc., Novi, MI (US)

( * ) Notice: Subject to any disclaimer, the term of this patent is extended or adjusted under 35 U.S.C. 154(b) by 464 days.

(21) Appl. No.: 13/061,402

(22) PCT Filed: Aug. 26, 2009

(86) PCT No.: PCT/US2009/055056
§ 371 (c)(1),
(2), (4) Date: Apr. 28, 2011

(87) PCT Pub. No.: WO2010/025189
PCT Pub. Date: Mar. 4, 2010

(65) Prior Publication Data
US 2011/0192013 A1    Aug. 11, 2011

Related U.S. Application Data

(60) Provisional application No. 61/091,814, filed on Aug. 26, 2008.

(51) Int. Cl.
*B23P 11/00*    (2006.01)

(52) U.S. Cl.
USPC .......................................................... 29/434

(58) Field of Classification Search
USPC ........... 29/505, 411, 412, 403, 428, 469, 525, 29/43; 428/31; 49/475.1, 490.1
See application file for complete search history.

(56) References Cited

U.S. PATENT DOCUMENTS

| | | |
|---|---|---|
| 4,220,681 A | 9/1980 | Narita |
| 4,904,508 A | 2/1990 | Madonia |
| 4,949,507 A | 8/1990 | Vaughan |
| 5,106,146 A | 4/1992 | Hanlon |
| 5,108,801 A | 4/1992 | Takahashi |

OTHER PUBLICATIONS

EP 09 81 0539 Supplementary European Search Report, mailed Feb. 24, 2012.
PCT/US2009/055056 International Search Report, and Written Opinion.

*Primary Examiner* — John C Hong
(74) *Attorney, Agent, or Firm* — Fay Sharpe LLP

(57) ABSTRACT

A decorative trim assembly and the process of manufacturing includes providing a clip, supplying an elongated metal bright strip, and inserting the clip inside the metal bright strip. Subsequently, bending the assembled bright strip with the clip along its longitudinal extent provides a final conformation of the structure. It is subsequently secured to a weatherstrip by snap-fit operation. The end customer maintains the ability to service the decorative trim piece independently of the weatherstrip system.

20 Claims, 4 Drawing Sheets

TRIM ATTACHMENT METHOD AND ASSOCIATED PRODUCT

BACKGROUND OF THE DISCLOSURE

This disclosure relates to a trim piece and more particularly a decorative trim received on a base member such as a trim component or reveal received on a weatherstrip on an automotive vehicle. However, the process of manufacturing and resulting assembly may find use in related environments and applications.

It is often desired that a trim piece, bright strip, or upper reveal assembly be included on an automotive vehicle, and is typically associated with the weatherstrip. In some instances, the bright strip assembly may be a metal structure such as stainless steel or aluminum, or a composite bright strip assembly will be secured to a clip, while in other instances the bright strip is incorporated into the seal itself (see for example, co-pending commonly owned international application Serial No. PCT/US08/66887, filed 13 Jun. 2008, based on U.S. provisional patent application Ser. No. 60/934,359, filed 13 Jun. 2007, the disclosure of which is expressly incorporated herein by reference. There are even instances where a separate trim piece is not attached to the weatherstrip or glass run, but is attached directly to the body. For example, a bright strip may be pop-riveted to the automotive body.

In one known manufacturing process, a bright strip assembly is formed from metal such as stainless steel that is roll formed or preformed into a desired shape (for example, a generally C-shaped cross-section) and advanced into an extrusion head. A material such as plastic, e.g., polypropylene, is cross-extruded or co-extruded onto the metal preform. Although commercially successful, there is the potential that the stainless steel or metal bright strip component can be scratched while passing through the extrusion head in this process. Further, when the cross-extruded material is cooled on the metal preform, the different thermal coefficients of expansion of the different materials (metal and plastic, for example), have a tendency to warp the final profile of the assembly.

Generally, the bright strip assembly is attached to the weatherstrip at the supplier's manufacturing plant and the weatherstrip with the bright strip is shipped to the OEM where the weatherstrip with integrated bright strip is assembled to the vehicle. Thus, for example, a known process extrudes the plastic onto the metal perform and the subassembly is integrated into the weatherstrip that is shipped to the OEM assembly plant. In this manner, if there is a scratch on the bright strip, or another issue associated with the reveal molding at the assembly plant, it may be necessary to replace the entire weatherstrip. Occasionally it is necessary to remove the door from the automotive vehicle to replace the weatherstrip.

As noted above, there is still the issue that the known processes result in potential scratching of the bright strip, or potential warping, i.e., aesthetic issues that detract from the perceived value of the automotive vehicle. Aside from the aesthetics, this can be very expensive when dealing with certain metals such as stainless steel, for example, where it is desired to keep the scrap percentage extremely low because of the cost of the material. Thus, in addition to the cost of the component itself, there is also a desire to be able to service the decorative trim piece independent of the weatherstrip system.

SUMMARY OF THE DISCLOSURE

A process of manufacturing a decorative trim assembly is disclosed for subsequent attachment to an associated weatherstrip.

The process includes providing a clip, supplying an elongated metal bright strip, inserting the clip inside the metal bright strip; and bending the assembled bright strip with the clip along its longitudinal extent.

A primary advantage relates to the ability to attach a decorative molding or bright strip to a weatherstrip.

Another advantage relates to obtaining a correct conformation after bending, i.e., better control of the final shape.

Yet another benefit resides in the ability to perform trimming and forming operation without secondary removal of co-extruded material.

A further advantage is offered by allowing the trim piece to be repaired independent of the weatherstrip.

Still other features and benefits of the invention will become more apparent from and understanding the following detailed description of the disclosure.

DETAILED DESCRIPTION OF THE PREFERRED EMBODIMENTS

Figure 1:
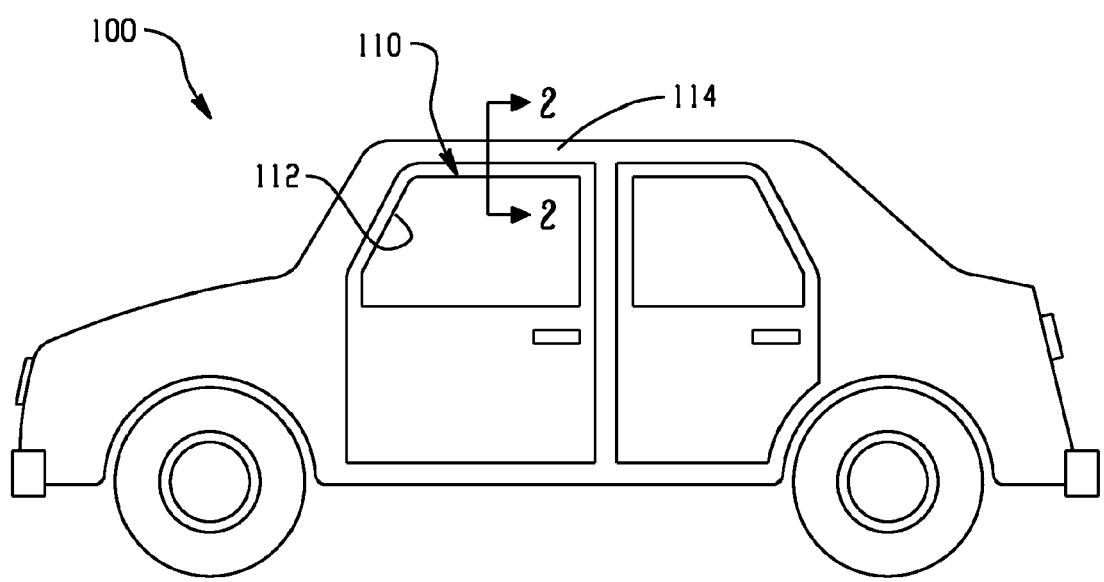
FIG. 1 is an elevational view of an automotive vehicle that includes a bright strip or upper reveal assembly, for example, along a header portion of a door window opening.

Turning first to FIG. 1, there is shown an automotive vehicle 100 that includes weatherstrips on selected portions of the vehicle, one such weatherstrip being a glass run 110. More particularly, the glass run is often an elastomeric material such as rubber or plastic that is secured about an opening 112 in the door for engagement with a portion of the window, such as along the periphery of the window, to seal the vehicle interior from the external environment. Although recent strides have been made to provide color matching with the vehicle surface and the vehicle interior, it is still common for the weatherstrip to have a black color (rubber or plastic surface).

One manner of improving the aesthetics is to incorporate a bright strip, such as a trim molding, trim strip, bright strip, or reveal surface, associated with the weatherstrip. That is, as noted in the Background, the weatherstrip will often include a bright strip as shipped to the OEM and when the weatherstrip is assembled to the vehicle, the bright strip is an integral portion of the weatherstrip.

As also previously noted, the bright strip is usually formed as an integral part of the weatherstrip or has a clip integrated onto the bright strip for subsequent assembly to the vehicle. By integrated, it is recognized that the clip does not move relative to the bright strip as a result of the co-extruding process where the clip material is extruded on an inner surface of the bright strip. It was also generally thought that mechanically assembling the clip to the bright strip was undesired. It would become necessary to rely on the extrusion tolerance of the plastic clip as well as the extrusion tolerance of the rubber (weatherstrip), plus there was a possibility of water infiltrating the assembly—all of which suggested that a mere mechanical assembly of the components would be undesirable. Further, with thermal cycling, it was believed that the clip (and thus the bright strip) would ultimately separate or become detached from the weatherstrip.

However, the present process allows for the clip to move relative to the bright strip, and preliminary testing shows that the bright strip with the clip maintains the desired attachment to the associated weatherstrip.

As shown in greater detail in FIG. 2, a header portion 114 of the weatherstrip is shown in cross-section taken along the lines 2-2 of FIG. 1. Thus, in FIG. 2, reference numeral 114 is representative of the remainder of the associated weatherstrip and is shown in dotted line. The present disclosure therefore is more particularly applicable to the bright strip assembly 120 shown in solid line in FIG. 2 and comprised of two primary components, namely the bright strip 122 and the clip 124. The bright strip assembly is sometimes referred to as the reveal assembly or decorative molding. The bright strip is oftentimes a metal structure, and stainless steel is a preferred metal because of its high brightness feature and also its resistance to corrosion. The bright strip has substantially the same thickness throughout the cross-section since the strip is typically formed from stock planar material.

Figure 2A:
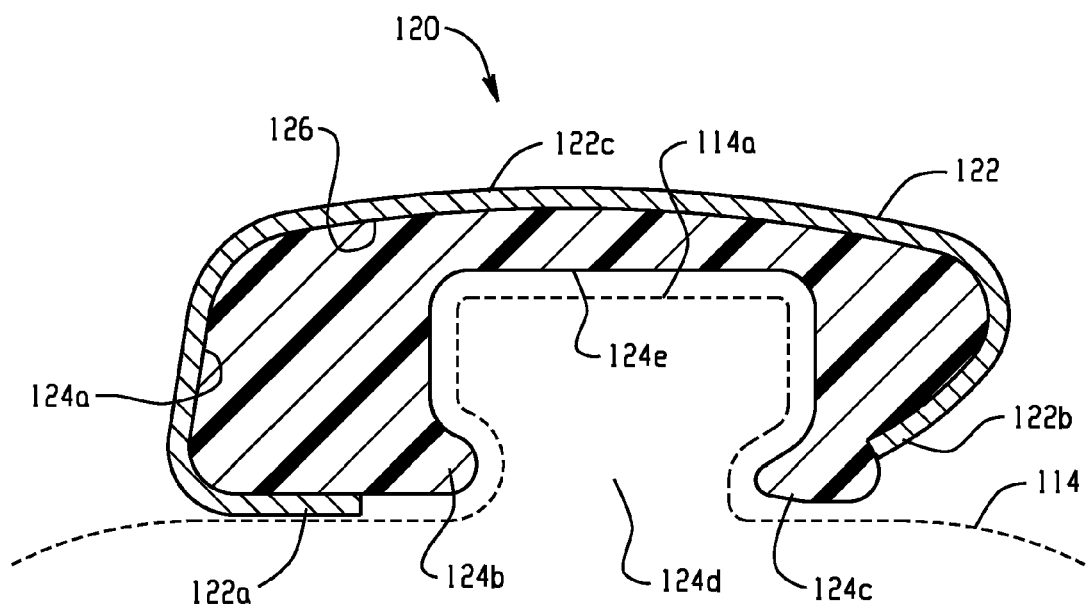
FIG. 2A is a cross-sectional view of a bright strip and clip combination of the present disclosure with a portion of an associated weatherstrip.

As shown in FIG. 2A, the final cross-sectional configuration of the bright strip has a generally C-shaped conformation in which legs 122a, 122b extend generally outward from a median section 122c and the legs are directed or curled inwardly adjacent outer terminal ends. The legs and median section of the bright strip form a cavity 126.

The plastic clip 124, on the other hand, has an outer perimeter portion 124a that closely conforms to the interior surface of the bright strip or conformation of the cavity 126. The clip further includes first and second shoulders 124b, 124c that are formed on generally opposite sides of the opening 124d that together form a cavity 124e that extends inwardly into the clip. The internal cavity has a generally mushroom-shaped configuration that conforms to a similarly shaped protrusion 114a of the weatherstrip. That is, the shoulders 124b, 124c of the clip define a reduced dimension that grips undercut regions of the weatherstrip protrusion and the cavity 124e receives the protrusion therein to provide a snap-fit connection that provides a secure connection between the clip and the weatherstrip. It will be appreciated by one skilled in the art, however, that the cross-sectional configuration is merely representative of the conformation of the bright strip assembly.

Figure 2B:
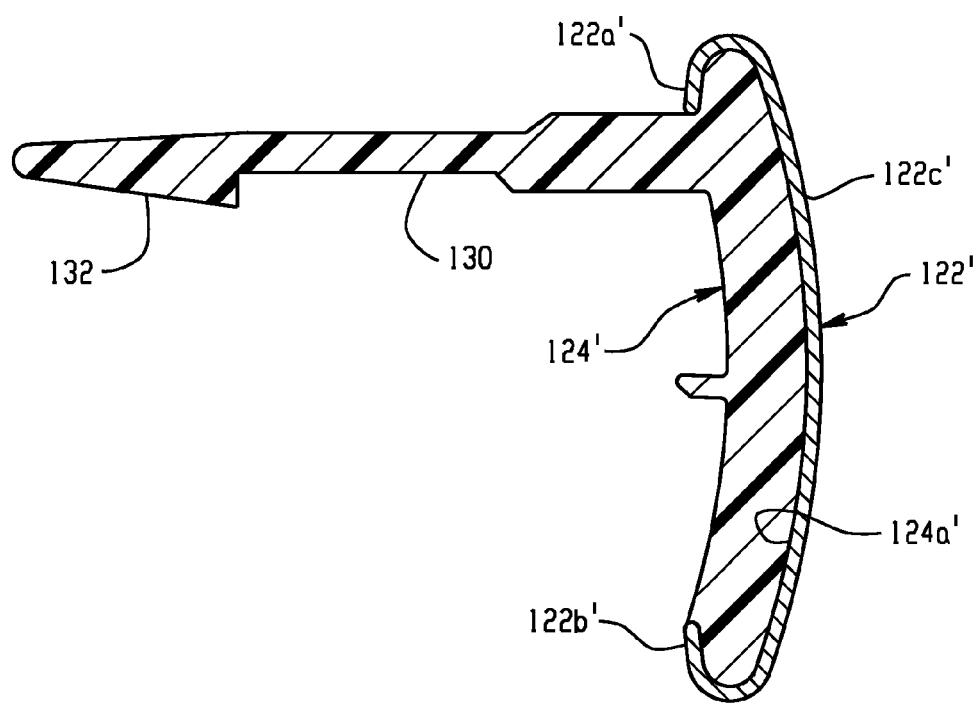
FIG. 2B is a cross-sectional view of an alternative bright strip and clip.

In FIG. 2B, the C-shaped conformation of the bright strip 122' is substantially the same as shown in FIG. 2A, and thus the above description applies with like components identified by like reference numerals with a primed suffix (e.g., bright strip 122 of FIG. 2A is identified as bright strip 122' in FIG. 2B.) The primary difference relates to clip 124' that has an outer perimeter 124' that still conforms to the interior surface of the bright strip but which eliminates the cavity of FIG. 2A and instead provides a connecting leg 130. The leg 130 is received in a corresponding groove (not shown) of an associated weatherstrip to secure the clip/bright strip to the weatherstrip (or easily remove/replace the bright strip). The clip leg 130 preferably includes a barb portion 132 that aids in retaining the bright strip and clip to the associated weateherstrip.

With continued reference to FIGS. 1 and 2, and additional reference to FIG. 3, a preferred process for forming the bright strip assembly will now be described. Bright strip forming step 150 may include rolling a strip of metal from coil stock of planar metal strip. For example, strip 122 has a generally planar conformation (see right-hand portion of step 150) and is subsequently formed into a generally U-shape denoted by 150b. Alternatively, the bright strip may have been preformed to the general U-shape. For example, a series of rollers may be used to progressively form the profile of the planar strip into a desired cross-sectional shape. In this instance, the bright strip forming step results in a generally U-shaped cross-section.

Clip inserting step 152 is associated with the introduction in-line of the clip 124 into the bright strip cavity 126. This inserting step is also represented on the right-hand portion of step 152 by the insertion of clip 124 into the cavity 126 of the U-shaped bright strip. As will be appreciated, the clip could be received from a roll of previously formed or extruded clip, or may be the result of a previous extruding step 154 shown upstream from the bright strip forming step 150. In step 156 further pre-forming of the bright strip, such as further forming of the legs 122a, 122b from the general U-shape in step 150, provides a resultant generally C-shaped cross-sectional configuration. This configuration mechanically retains the clip within the bright strip to define a bright strip assembly but also allows relative movement between the clip and bright strip in a longitudinal direction.

In step 158, rough cutting of the bright strip assembly to length is accomplished. That is, the bright strip and clip are a full profile so that for every millimeter of bright strip, there is an equivalent millimeter of plastic clip. Alternatively, one skilled in the art will understand that if the clip was previously formed (rather than incorporating the extruding clip step 154) then reduced length, individual clips may be inserted into the cavity 126 of the bright strip. For example, clip pieces may be axially spaced apart to provide adequate areas of bright strip retention on the associated weatherstrip, as will be described further below. As a part of the rough cutting of the assembly to length, it may also be necessary to remove end portions of the plastic clip at one or both ends in order to finish the end, as will be described below.

The substantially linear bright strip with the inserted clip then proceeds through a stretch bending operation (step 170) where the linear assembly is bent into an arc in one or more planes. In the past, this bending step potentially led to poor aesthetics where the clip was integrally attached to the bright strip and the different materials would not have the same stretch rate.

In step 172, one or both ends of the bright strip assembly are next formed or finished to provide improved end features that close-off the cut ends. At this juncture, the manufacturer of the bright strip assembly is ready to ship the completed product to the OEM (see step 174). In other words, the bright strip assembly is preferably not attached to the underlying weatherstrip. Rather, the assembly step 176 of the bright strip arrangement to the underlying weatherstrip is undertaken at the OEM. In this manner, final inspection of the bright strip occurs just prior to assembly to the weatherstrip which will result in reduced scrap, reduced labor costs, etc., since, if the bright strip is found to be unacceptable for some reason, it will no longer be necessary to replace the entire weatherstrip, or remove the door, for example, during the replacement efforts.

Figure 3:
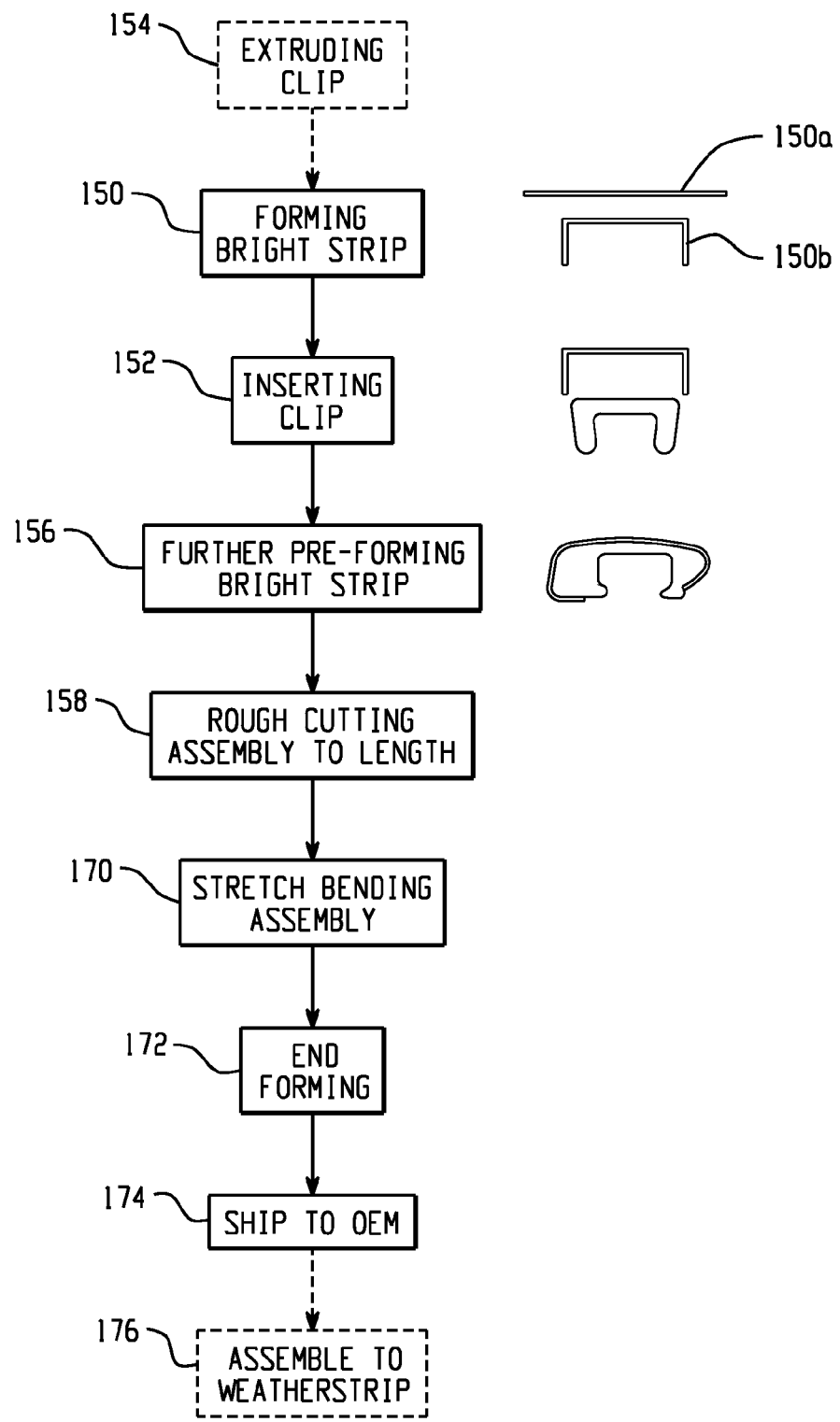
FIG. 3 is a schematic representation of a preferred manufacturing process.
Figure 4:
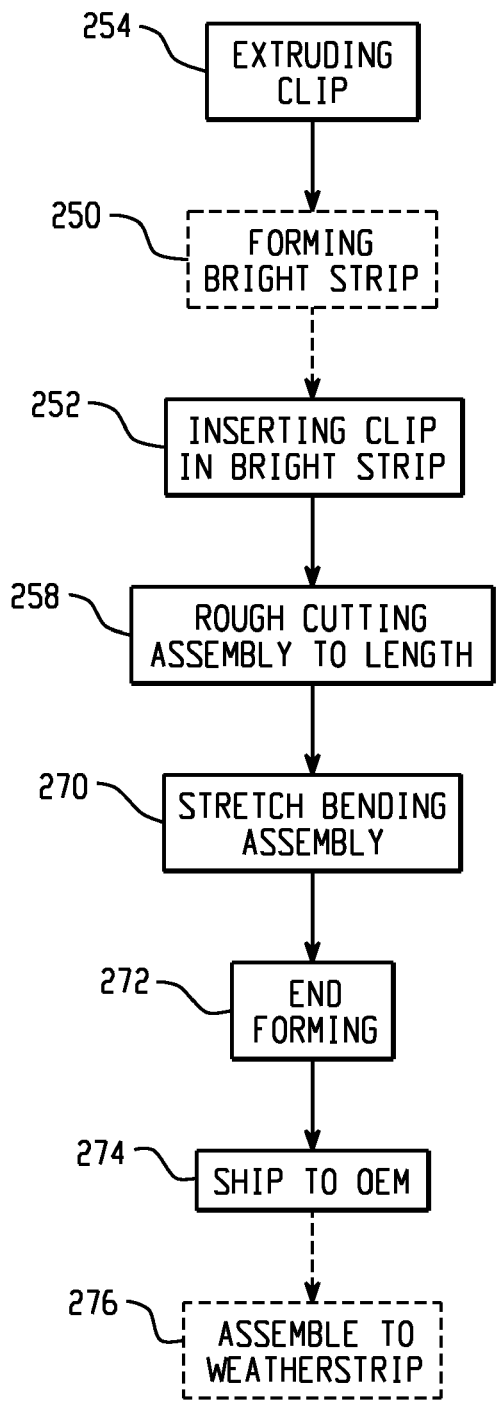
FIG. 4 is a schematic representation of another preferred manufacturing process.

FIG. 4 is similar to FIG. 3 and represents a process where similar steps will be identified by similar reference numerals in the 200 series (e.g., bright strip forming step 150 of FIG. 3 will now be identified by reference numeral 250) and new steps will include new reference numerals. The primary distinction relates to the elimination of a further preforming step. Although not as economically feasible, the bright strip forming step 250 may be such that the final C-shape of the bright strip can be completed before the clip inserting step 252. Instead, the clip can be sized and dimensioned for receipt in one open end of the formed bright strip prior to the same steps of rough cutting 258 to length, stretch bending 270, end forming 272, shipping 274, etc. before the bright strip assembly is attached to the weatherstrip as represented in step 276.

In summary, a method of manufacture and attachment of a decorative molding or bright strip assembly to a weatherstrip is provided so that a complete part can be submitted to the end customer (OEM) while maintaining the ability to service the decorative trim piece independently of the remainder of the weatherstrip system. A plastic insert or a clip, which in this case is preferably polypropylene (although other equivalent materials may be used), is merged inside a metal decorative trim piece, in this case preferably stainless steel (again, alternative materials may be used without departing from the scope and intent of the present disclosure), instead of using a well-known co-extrusion process. Moreover, a correct angle after bending can be achieved because the two components, namely the plastic insert and the metal trim piece, are able to move relative to one another in a longitudinal direction. The individual components of the bright strip assembly instead are merely held together through mechanical attachment. This provides better control of the final shape of the bright strip assembly and keeps the inner plastic clip free of variation through the bending process.

In addition, trimming and forming operations can be more easily performed without secondary removal of any co-extruded material at areas that require the re-work. For example, end forming operations are more easily accomplished with this arrangement.

Still another advantage is that the trim piece can be more easily serviced and repaired separately from the accompanying weatherstrip. The described arrangement can be used where other added trim components are commonly used, such as in glass sealing systems, interior trim systems, etc., and may even extend to non-automotive applications such as secondary attachment of trim in home and office industries, marina industries, etc.

The invention has been described with reference to the preferred embodiments. Modifications and alterations will occur to others upon reading and understanding this specification. It is intended to include all such modifications and alterations in so far as they come within the scope of the appended claims or the equivalents thereof.

Having thus described the invention, it is no claimed:

1. A process of manufacturing a decorative trim assembly that is subsequently attached to an associated weatherstrip comprising:
   providing a clip;
   supplying an elongated metal bright strip;
   assembling at least a portion of the clip to the metal bright strip such that relative movement between the clip and bright strip is allowed in a longitudinal direction; and
   bending the assembled bright strip with the clip along its longitudinal extent.

2. The process of claim 1 wherein the clip providing step includes extruding the clip upstream of the assembling step.

3. The process of claim 1 wherein the clip providing step includes supplying the clip from a previously manufactured inventory of continuous material.

4. The process of claim 3 wherein the inventory includes a roll and the supplying step includes the step of unrolling the clip from the roll.

5. The process of claim 1 wherein the bright strip supplying step includes forming the bright strip into a generally U-shaped cross-section to form a cavity.

6. The process of claim 5 wherein the assembling step includes introducing the clip into the bright strip cavity and subsequently deforming edges of the bright strip to mechanically retain the clip therein.

7. The process of claim 6 wherein the deforming step includes transforming the cross-section of the bright strip from the U-shaped cross-section into a C-shaped cross-section.

8. The process of claim 5 wherein the assembling step includes deforming an edge of the bright strip relative to the clip for mechanically joining the bright strip to the clip.

9. The process of claim 1 wherein the clip is a longitudinally continuous profile.

10. The process of claim 1 wherein the clip and bright strip have substantially equal longitudinal lengths.

11. The process of claim 1 further comprising securing the bent bright strip with clip on to an associated weatherstrip.

12. The process of claim 1 wherein the bright strip has a non-planar cross-sectional configuration and the process includes inserting the clip into the bright strip configuration.

13. The process of claim 1 wherein the assembling step includes inserting at least a portion of the clip inside the metal bright strip.

14. A product formed according to the process of claim 1.

15. The process of claim 1 wherein the clip providing step includes configuring the clip to have a generally mushroom-shaped internal cavity that conforms to an associated protrusion on the associated weatherstrip.

16. The process of claim 1 wherein the clip providing step includes configuring the clip to have a connecting leg dimensioned for receipt in an associated groove of the associated weatherstrip.

17. The process of claim 16 wherein the clip providing step includes providing a barb portion on the connecting leg of the clip to aid in retaining the clip to the associated weatherstrip.

18. The process of claim 1 further comprising rough cutting the clip and metal bright strip to a desired length.

19. The process of claim 18 wherein the bending step includes stretch bending the assembled bright strip with the clip along its longitudinal length.

20. The process of claim 1 further comprising end forming at least one end of the clip and bright strip assembly to close-off the at least one end.

* * * * *

UNITED STATES PATENT AND TRADEMARK OFFICE
CERTIFICATE OF CORRECTION

PATENT NO.       : 8,713,781 B2  
APPLICATION NO.  : 13/061402  
DATED            : May 6, 2014  
INVENTOR(S)      : Drozd et al.

Page 1 of 1

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 525 days.

Signed and Sealed this

Twenty-ninth Day of September, 2015

Michelle K. Lee  
*Director of the United States Patent and Trademark Office*